United States Patent
Ono et al.

(10) Patent No.: US 10,724,623 B2
(45) Date of Patent: Jul. 28, 2020

(54) FLUID PRESSURE LOOP

(71) Applicant: Honda Motor Co., Ltd., Tokyo (JP)

(72) Inventors: Yuki Ono, Saitama (JP); Tomoaki Mukai, Saitama (JP); Kota Inoue, Saitama (JP); Shunsuke Yoshida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 320 days.

(21) Appl. No.: 15/924,279

(22) Filed: Mar. 19, 2018

(65) Prior Publication Data

US 2018/0274661 A1  Sep. 27, 2018

(30) Foreign Application Priority Data

Mar. 22, 2017 (JP) .................................. 2017-055861

(51) Int. Cl.
  *F16H 57/04* (2010.01)
  *F16H 61/00* (2006.01)

(52) U.S. Cl.
  CPC ..... *F16H 57/0446* (2013.01); *F16H 57/0436* (2013.01); *F16H 61/0025* (2013.01); *F16H 2061/0037* (2013.01)

(58) Field of Classification Search
  CPC ......... F16H 2061/0037; F16H 57/0435; F16H 61/0021; B62D 11/08; F01L 13/0026
  USPC ...................................................... 184/6.12
  See application file for complete search history.

(56) References Cited

U.S. PATENT DOCUMENTS

| | | | | |
|---|---|---|---|---|
| 3,659,668 A * | 5/1972 | Ross | ..................... | B62D 11/08 180/6.7 |
| 4,622,817 A * | 11/1986 | Kobayashi | ............. | F02B 37/10 184/6.22 |
| 4,864,823 A * | 9/1989 | Ikejiri | ..................... | F16H 61/40 60/488 |
| 5,669,479 A * | 9/1997 | Matsufuji | ........... | F16D 48/0206 192/85.63 |
| 7,018,178 B2 * | 3/2006 | Hunter | .................... | F04C 14/22 417/219 |
| 8,230,975 B2 * | 7/2012 | Lukas | ................... | F04C 14/223 184/26 |
| 9,022,176 B2 * | 5/2015 | Curtis | ................ | F16H 57/0413 165/51 |
| 2006/0070600 A1 * | 4/2006 | Hara | ........................ | F01L 1/46 123/196 R |
| 2009/0211850 A1 * | 8/2009 | Moorman | ........... | F16H 61/0021 184/6.12 |
| 2013/0240299 A1 * | 9/2013 | Jagdale | ..................... | F16N 7/38 184/6.14 |

(Continued)

FOREIGN PATENT DOCUMENTS

JP    2015200369    11/2015

*Primary Examiner* — Henry Y Liu
(74) *Attorney, Agent, or Firm* — JCIPRNET

(57) ABSTRACT

The lubrication loop 5 includes a first lubrication flow path L4, a release flow path L6, a low pressure fluid discharge valve 13, a return flow path L7, and a discharge flow path L8. In the low pressure fluid discharge valve 13, an accumulator piston 22 is biased to the other end side of a piston housing chamber 21 by a spring 26 when a pressure of the fluid applied to a piston position control chamber 27 is less than a predetermined pressure so that a supply port 24 and a discharge port 25 communicate with each other via a spool groove 32.

4 Claims, 4 Drawing Sheets

(56) References Cited

U.S. PATENT DOCUMENTS

2013/0333508 A1\* 12/2013 Lundberg ............ F16H 61/0021
74/473.11

\* cited by examiner

FLUID PRESSURE LOOP

CROSS-REFERENCE TO RELATED APPLICATION

This application claims the priority benefit of Japan application serial no. 2017-055861, filed on Mar. 22, 2017. The entirety of the above-mentioned patent application is hereby incorporated by reference herein and made a part of this specification.

BACKGROUND

Technical Field

The disclosure relates to a fluid pressure loop including a lubrication loop and a fluid pump for feeding a fluid to the lubrication loop.

Description of Related Art

Conventionally, a fluid pressure loop for controlling an automatic transmission with a fluid pressure supplied from a fluid pump is known (for example, see Patent Document 1). The automatic transmission of Patent Document 1 is a belt type stepless transmission, and the fluid pressure loop includes an operation system loop formed with pulleys and a lubrication system loop that supplies a fluid to parts of the stepless transmission for lubricating or cooling them.

[Patent Document 1] Japanese Unexamined Patent Application, First Publication No. 2015-200369

In a fluid pressure loop, a fluid fed from a fluid pump to a flow path by a driving force of an engine is sent to a lubrication system loop (hereinafter referred to as a lubrication loop) via a pressure control valve controlled by a fluid pressure. Generally, in a lubrication loop, in order to supply a sufficient amount of fluid (hereinafter referred to as lubricating oil) to a lubricating portion such as gears and clutches, it is conceivable that a lubricating pressure adjusting valve is provided to supply lubricating oil at a constant pressure to the lubricating portion in accordance with a flow rate of lubricating oil that is required when a mechanical load of the lubricating portion is high. However, in a case in which the above-described lubricating pressure adjusting valve is provided in a lubrication loop, when the mechanical load of the lubricating portion is low such as at the time of cruising, the flow rate of the lubricating oil becomes excessive and mechanical resistance increases, thereby causing deterioration in fuel efficiency.

SUMMARY

The disclosure has been made in view of the above-described points, and the disclosure to provides a fluid pressure loop capable of reducing a flow rate of lubricating oil in a lubrication loop when a pressure of the lubricating oil in the lubrication loop is low such as at the time of cruising in which a mechanical load of a lubricating portion is low.

The disclosure provides a fluid pressure loop (for example, a fluid pressure loop 1 of the embodiment; the same applies below) including an operation loop (for example, an operation loop 3 of the embodiment; the same applies below) which supplies a fluid (for example, a lubricating oil of the embodiment; the same applies below) to an operating portion (for example, an operating portion 2 of the embodiment; the same applies below), a lubrication loop (for example, a lubrication loop 5 of the embodiment; the same applies below) which supplies a fluid to a lubricating portion (for example, a lubricating portion 4 of the embodiment; the same applies below), a fluid pump (for example, a hydraulic pump 6 of the embodiment; the same applies below) which feeds the fluid, and a main control valve (for example, a main control valve 7 of the embodiment; the same applies below) which controls a fluid pressure of the operation loop by controlling a flow rate of the fluid from the fluid pump to the lubrication loop, in which the lubrication loop includes a lubrication flow path (for example, a lubrication flow path L4 of the embodiment; the same applies below) which introduces the fluid from the main control valve, a release flow path (for example, a release flow path L6 of the embodiment; the same applies below) connected to the lubrication flow path and configured to release the fluid, a low pressure fluid discharge valve (for example, a low pressure fluid discharge valve 13 of the embodiment; the same applies below) connected to the release flow path and configured to discharge the fluid of the lubrication flow path, a return flow path (for example, a return flow path L7 of the embodiment; the same applies below) connected to the low pressure fluid discharge valve and configured to return the fluid to the fluid pump, and a discharge flow path (for example, a discharge flow path L8 of the embodiment; the same applies below) which introduces the fluid discharged from the fluid pump into the low pressure fluid discharge valve, in which the low pressure fluid discharge valve includes a piston housing chamber (for example, a piston housing chamber 21 of the embodiment; the same applies below) formed in a cylindrical shape, a piston (for example, an accumulator piston 22 of the embodiment; the same applies below) slidably housed in the piston housing chamber, an annular supply port (for example, a supply port 24 of the embodiment; the same applies below) formed on an inner circumferential surface (for example, an inner circumferential surface 23 of the embodiment; the same applies below) of the piston housing chamber and connected to the release flow path, a discharge port (for example, a discharge port 25 of the embodiment; the same applies below) formed in an annular shape at a distance from the supply port in the piston housing chamber and connected to the return flow path, a spring (for example, a spring 26 of the embodiment; the same applies below) disposed at one end of the piston housing chamber and configured to bias the piston to the other end, a piston position control chamber (for example, a piston position control chamber 27 of the embodiment; the same applies below) formed in the piston housing chamber on a side opposite to the supply port with respect to the discharge port and configured to make a pressure of the fluid of the discharge flow path work, and an annular spool groove (for example, an annular spool groove 32 of the embodiment; the same applies below) formed on an outer circumferential surface (for example, an outer circumferential surface 31 of the embodiment; the same applies below) of the piston and having a width extending from the supply port to the discharge port, in which the piston is biased to the other end side of the piston housing chamber due to the spring when the pressure of the fluid applied to the piston position control chamber is less than a predetermined pressure so that the supply port and the discharge port communicate with each other via the spool groove, and the piston is moved to one end side of the piston housing chamber against a biasing force of the spring by applying a pressure of the fluid equal to or higher than the predetermined pressure to the piston position control chamber so that the supply port and the discharge port are blocked from each other.

DESCRIPTION OF THE EMBODIMENTS

Figure 1:
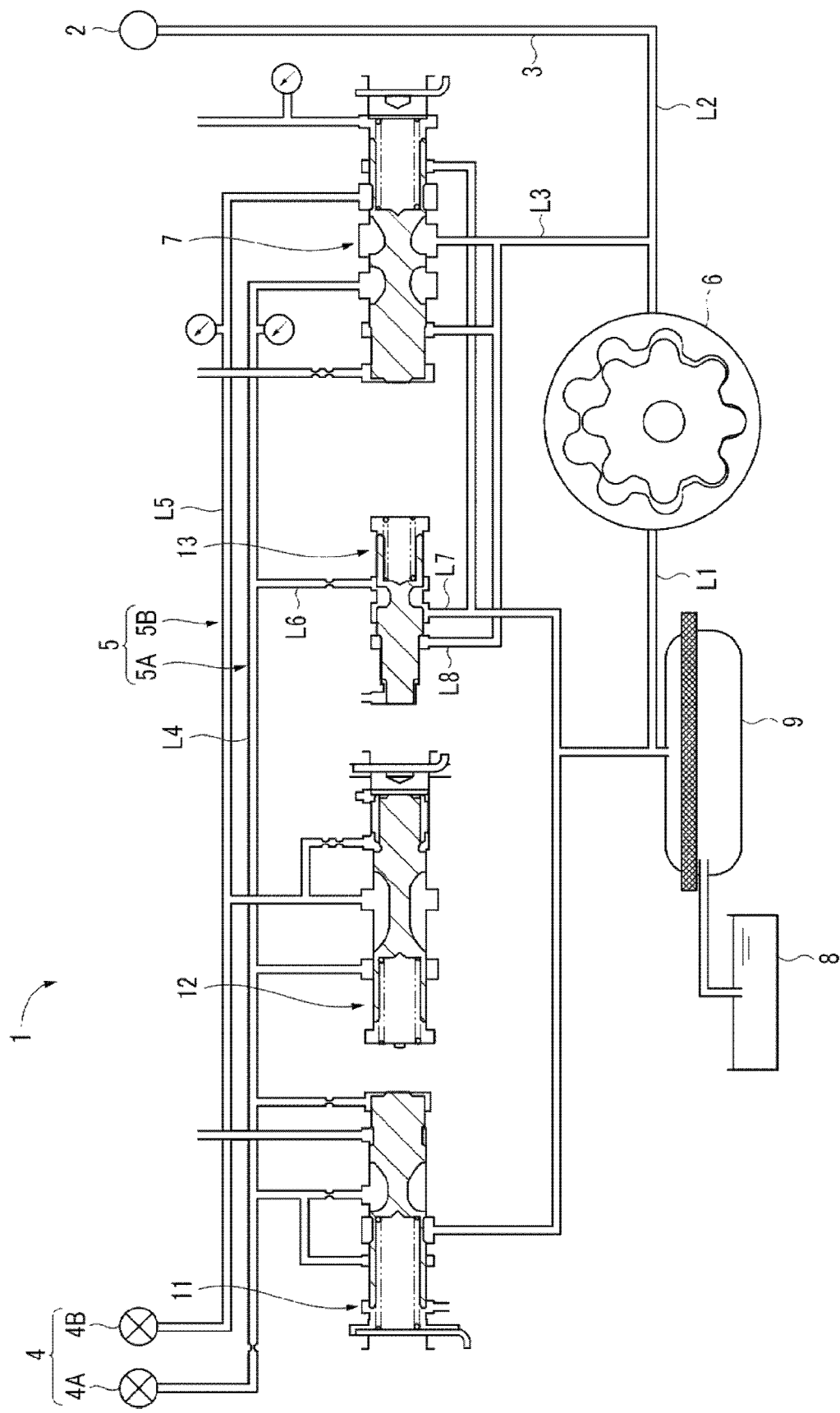
FIG. 1 is an explanatory view schematically illustrating an embodiment of a fluid pressure loop of the disclosure.

[1] The disclosure provides a fluid pressure loop (for example, a fluid pressure loop 1 of the embodiment; the same applies below) including an operation loop (for example, an operation loop 3 of the embodiment; the same applies below) which supplies a fluid (for example, a lubricating oil of the embodiment; the same applies below) to an operating portion (for example, an operating portion 2 of the embodiment; the same applies below), a lubrication loop (for example, a lubrication loop 5 of the embodiment; the same applies below) which supplies a fluid to a lubricating portion (for example, a lubricating portion 4 of the embodiment; the same applies below), a fluid pump (for example, a hydraulic pump 6 of the embodiment; the same applies below) which feeds the fluid, and a main control valve (for example, a main control valve 7 of the embodiment; the same applies below) which controls a fluid pressure of the operation loop by controlling a flow rate of the fluid from the fluid pump to the lubrication loop, in which the lubrication loop includes a lubrication flow path (for example, a lubrication flow path L4 of the embodiment; the same applies below) which introduces the fluid from the main control valve, a release flow path (for example, a release flow path L6 of the embodiment; the same applies below) connected to the lubrication flow path and configured to release the fluid, a low pressure fluid discharge valve (for example, a low pressure fluid discharge valve 13 of the embodiment; the same applies below) connected to the release flow path and configured to discharge the fluid of the lubrication flow path, a return flow path (for example, a return flow path L7 of the embodiment; the same applies below) connected to the low pressure fluid discharge valve and configured to return the fluid to the fluid pump, and a discharge flow path (for example, a discharge flow path L8 of the embodiment; the same applies below) which introduces the fluid discharged from the fluid pump into the low pressure fluid discharge valve, in which the low pressure fluid discharge valve includes a piston housing chamber (for example, a piston housing chamber 21 of the embodiment; the same applies below) formed in a cylindrical shape, a piston (for example, an accumulator piston 22 of the embodiment; the same applies below) slidably housed in the piston housing chamber, an annular supply port (for example, a supply port 24 of the embodiment; the same applies below) formed on an inner circumferential surface (for example, an inner circumferential surface 23 of the embodiment; the same applies below) of the piston housing chamber and connected to the release flow path, a discharge port (for example, a discharge port 25 of the embodiment; the same applies below) formed in an annular shape at a distance from the supply port in the piston housing chamber and connected to the return flow path, a spring (for example, a spring 26 of the embodiment; the same applies below) disposed at one end of the piston housing chamber and configured to bias the piston to the other end, a piston position control chamber (for example, a piston position control chamber 27 of the embodiment; the same applies below) formed in the piston housing chamber on a side opposite to the supply port with respect to the discharge port and configured to make a pressure of the fluid of the discharge flow path work, and an annular spool groove (for example, an annular spool groove 32 of the embodiment; the same applies below) formed on an outer circumferential surface (for example, an outer circumferential surface 31 of the embodiment; the same applies below) of the piston and having a width extending from the supply port to the discharge port, in which the piston is biased to the other end side of the piston housing chamber due to the spring when the pressure of the fluid applied to the piston position control chamber is less than a predetermined pressure so that the supply port and the discharge port communicate with each other via the spool groove, and the piston is moved to one end side of the piston housing chamber against a biasing force of the spring by applying a pressure of the fluid equal to or higher than the predetermined pressure to the piston position control chamber so that the supply port and the discharge port are blocked from each other.

Here, when the pressure of the fluid in the discharge flow path is low, the pressure of the fluid in the lubrication flow path also becomes low. The low pressure fluid discharge valve is provided in the lubrication loop, and since the piston is biased to the other end side of the piston housing chamber by the spring when the pressure of the fluid applied to the piston position control chamber to which the discharge flow path is connected is less than a predetermined pressure, and thus the supply port and the discharge port communicate with each other via the spool groove, the fluid at a low pressure in the lubrication flow path can be discharged. On the other hand, when the pressure of the fluid in the discharge flow path is high, the piston moves to one end side of the piston housing chamber against a biasing force of the spring by the pressure of the fluid equal to or higher than the predetermined pressure applied to the piston position control chamber, and thus the supply port and the discharge port are blocked from each other, discharge of the fluid at a high pressure in the lubrication flow path can be stopped. As a result, when the pressure of the fluid in the lubrication loop is low and a mechanical load of the lubricating portion is low at the time of cruising, a flow rate of the fluid in the lubrication loop can be reduced and fuel efficiency can be improved.

Further, since extra fluid of the lubrication loop is returned from the return flow path to the fluid pump, it is possible to improve efficiency of the pump and further improve fuel efficiency.

Further, when the pressure of the fluid in the discharge flow path further increases and approaches a fluid pressure equal to or higher than that at which function is guaranteed, the piston moves further to one end side of the piston housing chamber due to the increased fluid pressure applied to the piston position control chamber, the piston position control chamber communicates with the discharge port. Therefore, the fluid in the discharge flow path is released to the return flow path, and thereby the pressure of the fluid in the discharge flow path can be prevented from becoming equal to or higher than the function guarantee and reliability can be improved.

[2] Further, in the disclosure, it is preferable that the low pressure fluid discharge valve serves also as a pressure accumulator which mitigates pulsation of the fluid discharged from the fluid pump by introducing the fluid in the discharge flow path into the piston position control chamber. Since the low pressure fluid discharge valve also has the function as the pressure accumulator, oil vibration can be reduced by mitigating the pulsation of the fluid discharged from the fluid pump.

Further, since only a spool groove is provided in a piston of an ordinary pressure accumulator, it is not necessary to add an additional pressure accumulator as a new part and thus the costs of parts can be reduced.

[3] Further, in the disclosure, it is preferable that an orifice (for example, the orifice 33 of the embodiment; the same applies below) is formed in the release flow path. Due to the orifice, it is possible to adjust the flow rate of the fluid being discharged.

A fluid pressure loop of an embodiment of the disclosure will be described with reference to the drawings. As illustrated in FIG. 1, a fluid pressure loop 1 according to the embodiment of the disclosure supplies a fluid (hereinafter referred to as lubricating oil) to a power transmission device mounted on a vehicle (automobile), and includes an operation loop 3 which supplies the lubricating oil to an operating portion 2 such as a friction clutch provided in the power transmission device, a lubrication loop 5 which supplies the lubricating oil to a lubricating portion 4 formed of parts of the operating portion 2 and the like, a fluid pump (hereinafter referred to as a hydraulic pump) 6 which feeds the lubricating oil using power of a driving source ENG (internal combustion engine or electric motor), and a main control valve 7 which controls a fluid pressure of the operation loop 3 by controlling a flow rate of the lubricating oil from the hydraulic pump 6 to the lubrication loop 5.

The lubricating portion 4 is formed of a first lubricating portion 4A including parts such as a friction clutch and a second lubricating portion 4B including a differential gear of the power transmission device and the like. The lubrication loop 5 is formed of a first lubrication loop 5A which introduces the lubricating oil into the friction clutch and the like constituting the first lubricating portion 4A via a main shaft or the like, and a second lubrication loop 5B which supplies the lubricating oil whose temperature has been adjusted by an oil warmer to a differential gear and the like constituting the second lubricating portion 4B.

Also, the fluid pressure loop 1 includes an oil pan 8 which stores the lubricating oil in the fluid pressure loop 1, a strainer 9 which removes foreign matter of the lubricating oil from the oil pan 8, a first flow path L1 which introduces the lubricating oil from the strainer 9 into the hydraulic pump 6, a second flow path L2 which introduces the lubricating oil fed from the hydraulic pump 6 into the operation loop 3, a third flow path L3 branching off from the second flow path L2 and connected to the main control valve 7, a first lubrication flow path L4 which introduces the lubricating oil from the main control valve 7 into the first lubrication loop 5A, and a second lubrication flow path L5 which introduces the lubricating oil from the main control valve 7 into the second lubrication loop 5B.

The hydraulic pump 6 suctions up the lubricating oil stored in the oil pan 8 via the strainer 9 and the first flow path L1 and feeds it to the second flow path L2. The lubricating oil introduced from the second flow path L2 into the third flow path L3 is fed to the first lubrication flow path L4 and the second lubrication flow path L5 when the main control valve 7 opens.

The lubrication loop 5 includes a first lubrication pressure adjusting valve 11, a second lubrication pressure adjusting valve 12, and a low pressure fluid discharge valve 13. The first lubrication pressure adjusting valve 11 releases the lubricating oil in the first lubrication flow path L4 to the first flow path L1 when a pressure of the lubricating oil in the first lubrication flow path L4 is equal to or higher than a predetermined pressure. The second lubrication pressure adjusting valve 12 releases the lubricating oil in the second lubrication flow path L5 to the first lubrication flow path L4 when a pressure of the lubricating oil in the second lubrication flow path L5 becomes higher than a difference between the pressure of the lubricating oil in the second lubrication flow path L5 and the pressure of the lubricating oil in the first lubrication flow path L4 by a predetermined pressure or more. The low pressure fluid discharge valve 13 blocks a flow of the lubricating oil from the first lubrication flow path L4 to the first flow path L1 when a pressure of the lubricating oil in the third flow path L3 is equal to or higher than a predetermined pressure.

Figure 2:
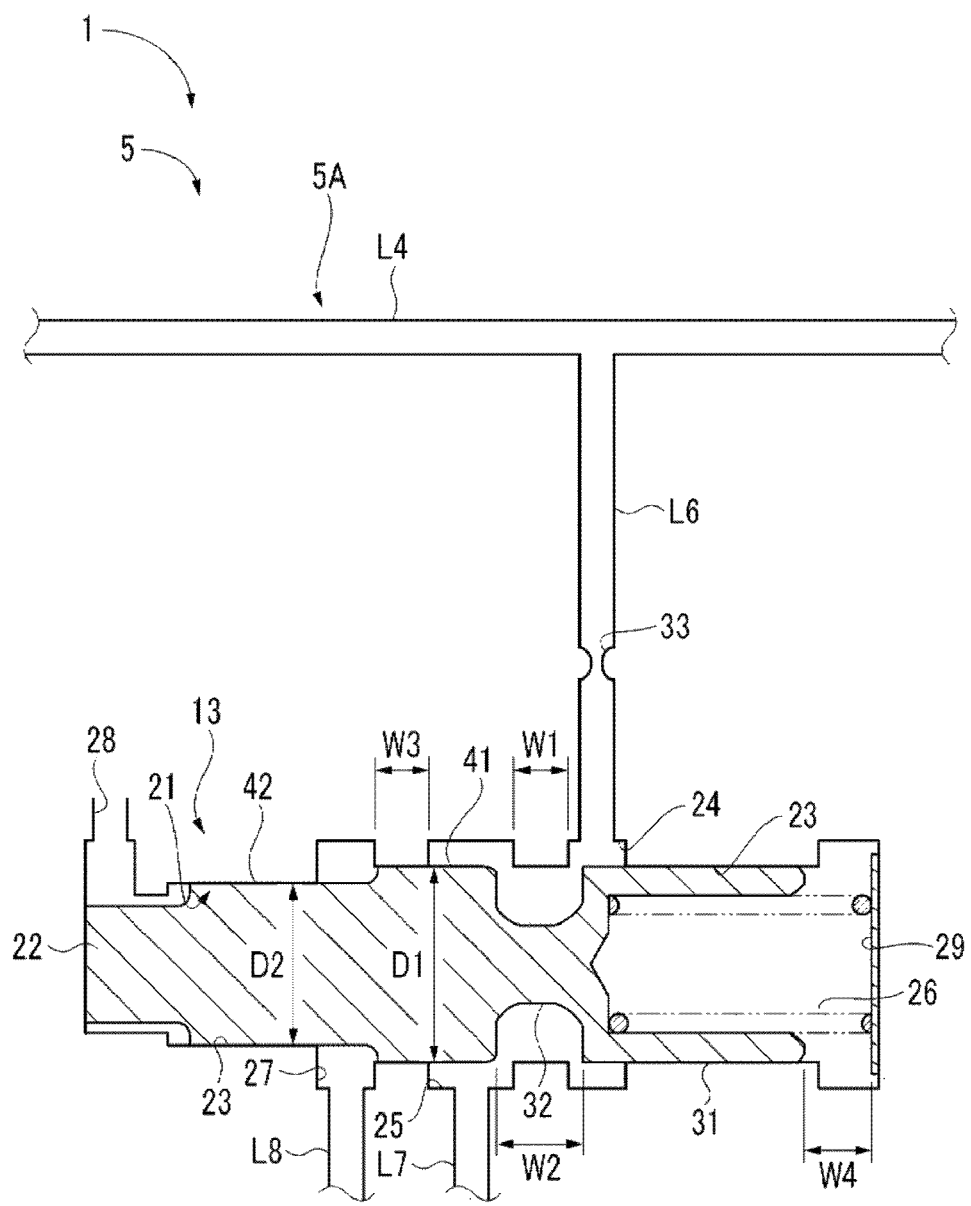
FIG. 2 is an explanatory view illustrating a cross section of a low pressure fluid discharge valve according to the present embodiment.

FIG. 2 is a cross sectional view illustrating a low pressure fluid discharge valve 13. The first lubrication loop 5A includes the first lubrication flow path L4 which introduces the lubricating oil from the main control valve 7 (see FIG. 1), a release flow path L6 connected to the first lubrication flow path L4 and configured to release the lubricating oil, the low pressure fluid discharge valve 13 connected to the release flow path L6 and configured to discharge the lubricating oil flowing through the first lubrication flow path L4, a return flow path L7 connected to the low pressure fluid discharge valve 13 and configured to return the lubricating oil to the hydraulic pump 6 (see FIG. 1) via the first flow path L1 (see FIG. 1), and a discharge flow path L8 which introduces the lubricating oil discharged from the hydraulic pump 6 (see FIG. 1) to the low pressure fluid discharge valve 13 via the third flow path L3 (see FIG. 1).

The low pressure fluid discharge valve 13 includes a piston housing chamber 21 formed in a cylindrical shape, a piston 22 (hereinafter referred to as an accumulator piston) slidably housed in the piston housing chamber 21, an annular supply port 24 formed on the inner circumferential surface 23 of the piston housing chamber 21 and connected to the release flow path L6, a discharge port 25 annularly formed at a distance W1 from the supply port 24 in the piston housing chamber 21 and connected to the return flow path L7, a spring 26 disposed at one end of the piston housing chamber 21 and configured to bias the accumulator piston 22 to the other end, a piston position control chamber 27 formed in the piston housing chamber 21 on a side opposite to the supply port 24 with respect to the discharge port 25 and configured to make a pressure of the lubricating oil in the discharge flow path L8 work, an annular spool groove 32 formed on the outer circumferential surface 31 of the accumulator piston 22 and having a width W2 extending from the supply port 24 to the discharge port 25, and an open port 28 formed at the other end of the piston housing chamber 21 and configured to discharge the lubricating oil.

In this configuration, since the width W2 is larger than the distance W1, when the pressure of the lubricating oil applied to the piston position control chamber 27 is less than a predetermined pressure, the accumulator piston 22 is biased by the spring 26 toward the other end side of the piston housing chamber 21 and thus the supply port 24 and the discharge port 25 communicate with each other via the spool groove 32.

In addition, in the above configuration, when a pressure of the lubricating oil equal to or higher than the predetermined pressure is applied to the piston position control chamber 27, the accumulator piston 22 is moved to one end side of the piston housing chamber 21 against the biasing force of the spring 26 and thus the supply port 24 and the discharge port 25 are blocked from each other.

One end side of the accumulator piston 22 is hollow and formed in a tubular shape, and since this portion formed in a tubular shape serves the role of a spring seat and guides the spring 26, it is possible to direct the biasing force of the spring 26 in an axial direction of the accumulator piston 22 to smoothly slide the accumulator piston 22.

In addition, the low pressure fluid discharge valve 13 serves also as a pressure accumulator. When the lubricating oil in the discharge flow path L8 is introduced into the piston position control chamber 27, the pressure accumulator mitigates pulsation of the lubricating oil discharged from the hydraulic pump 6 within an arbitrary stroke of the accumulator piston 22. Since the low pressure fluid discharge valve 13 also functions as the pressure accumulator, oil vibration can be reduced by mitigating the pulsation of the lubricating oil discharged from the hydraulic pump 6. Further, since the spool groove 32 is provided in the piston of the pressure accumulator for an oil vibration countermeasure in constituting the low pressure fluid discharge valve 13, it is not necessary to add the low pressure fluid discharge valve 13 which is separate from the pressure accumulator as a new part, and thereby it is possible to reduce the number of parts and the cost, and it is possible to reduce the size and weight.

Also, the piston position control chamber 27 is annularly formed at a distance W3 from the discharge port 25. In a state in which a distal end of the accumulator piston 22 comes into contact with the other end of the piston housing chamber 21, a distance from an end portion of the accumulator piston 22 to a spring seat 29 of the spring 26 is W4. In other words, a length of the piston housing chamber 21 in the axial direction is longer than a length of the accumulator piston 22 in the axial direction by W4. A large diameter portion 41 having a diameter D1 and a small diameter portion 42 having a diameter D2 are formed in the accumulator piston 22.

A portion of the inner circumferential surface 23 of the piston housing chamber 21 near one end side of the piston housing chamber 21 than the piston position control chamber 27 is formed to have a large diameter D1, and a portion of the inner circumferential surface 23 of the piston housing chamber 21 near the other end side of the piston housing chamber 21 than the piston position control chamber 27 is formed to have a small diameter D2. Since the diameter D1 is larger than the diameter D2 and the distance W4 is larger than the distance W3, when the accumulator piston 22 moves to a position at which the end portion of the accumulator piston 22 comes into contact with the spring seat 29, the small diameter portion 42 moves to a position of the discharge port 25 and thereby the piston position control chamber 27 and the discharge port 25 communicate with each other.

An orifice 33 is formed in the release flow path L6. The flow rate of the discharged lubricating oil can be adjusted through the orifice 33.

Next, a fluid block operation of the low pressure fluid discharged from the above-described low pressure fluid discharge valve 13 will be described.

Figure 3A:
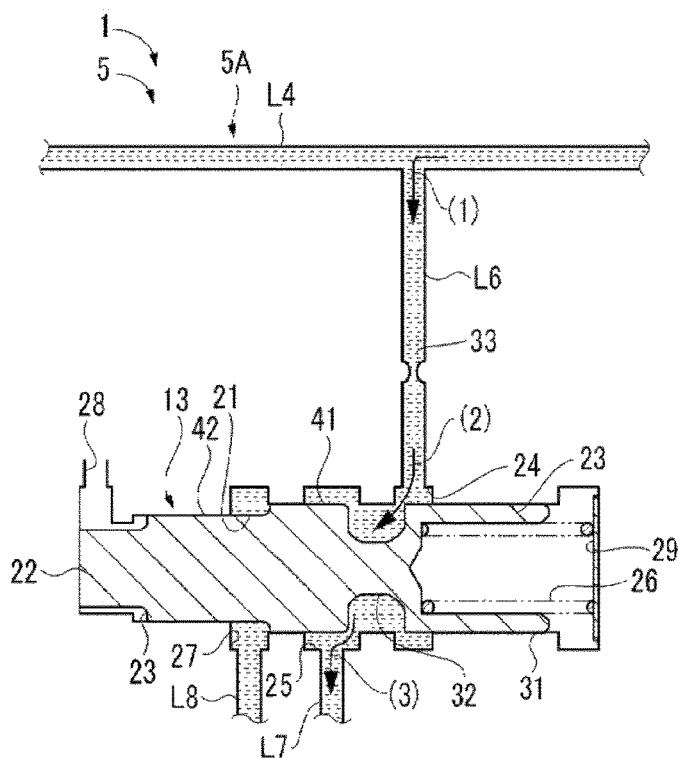
FIGS. 3A and 3B are operational views of the low pressure fluid discharge valve of the present embodiment from low pressure fluid discharge to fluid shut-off.

As illustrated in FIG. 3A, when a pressure of the lubricating oil entering the piston position control chamber 27 from the discharge flow path L8 is less than a predetermined pressure, the accumulator piston 22 is biased toward the other end side of the piston housing chamber 21 by the spring 26, and thereby the supply port 24 and the discharge port 25 communicate with each other via the spool groove 32.

The lubricating oil in the first lubrication flow path L4 is introduced into the release flow path L6 (arrow (1)), and is fed to the spool groove 32 through the orifice 33 (arrow (2)). The lubricating oil fed to the spool groove 32 is discharged from the discharge port 25 to the return flow path L7 (arrow (3)).

As described above, although the pressure of the lubricating oil in the first lubrication flow path L4 also reduces when the pressure of the lubricating oil in the discharge flow path L8 is low, since the low pressure fluid discharge valve 13 is provided in the first lubrication loop 5A, it is possible to discharge the fluid at a low pressure in the first lubrication flow path L4. As a result, the flow rate of the lubricating oil of the lubrication loop 5 at the time of cruising or the like can be reduced, and frictional resistance due to the lubricating oil of the lubricating portion 4 (see FIG. 1) can be reduced, thereby improving fuel efficiency. Further, since extra lubricating oil in the lubrication loop 5 is returned from the return flow path L7 to the hydraulic pump 6, pumping efficiency can be improved and the fuel efficiency can be further improved.

Figure 3B:
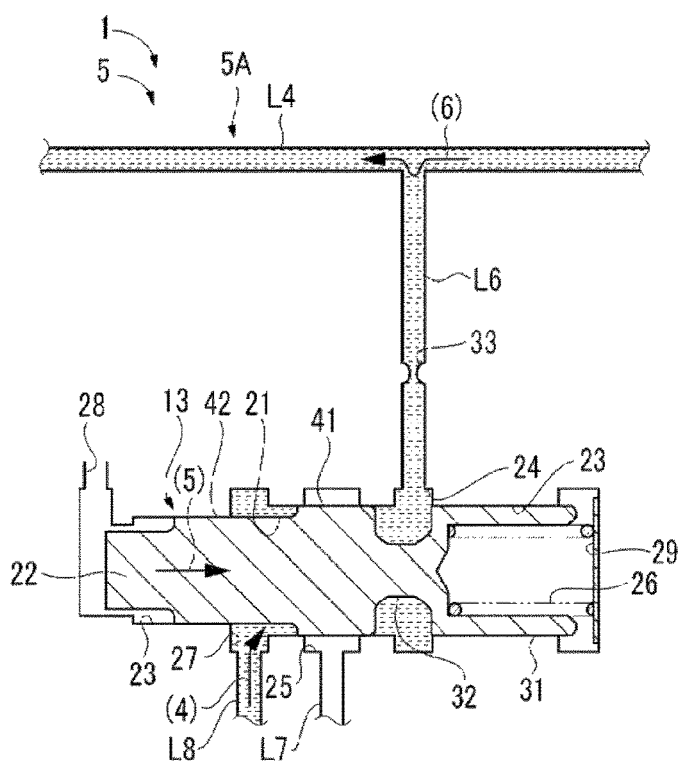

As illustrated in FIG. 3B, when a pressure of the lubricating oil in the discharge flow path L8 becomes equal to or higher than a predetermined pressure, the lubricating oil enters the piston position control chamber 27 from the discharge flow path L8, and a pressure of the lubricating oil in the piston position control chamber 27 becomes equal to or higher than the predetermined pressure (arrow (4)). The accumulator piston 22 is moved to one end side of the piston housing chamber 21 against the biasing force of the spring 26 (arrow (5)), and the supply port 24 and the discharge port 25 are blocked due to the large diameter portion 41. Therefore, the lubricating oil in the first lubrication flow path L4 flows through the first lubrication flow path L4 as it is without being released from the release flow path L6 (arrow (6)). In this way, when the pressure of the lubricating oil in the discharge flow path L8 is equal to or higher than the predetermined pressure and a large amount of the lubricating oil is required in the lubricating portion 4, an amount of the lubricating oil supplied to the lubricating portion 4 can be increased by blocking the supply port 24 and the discharge port 25 from each other to stop discharge of the lubricating oil in the first lubrication flow path L4.

Figure 4:
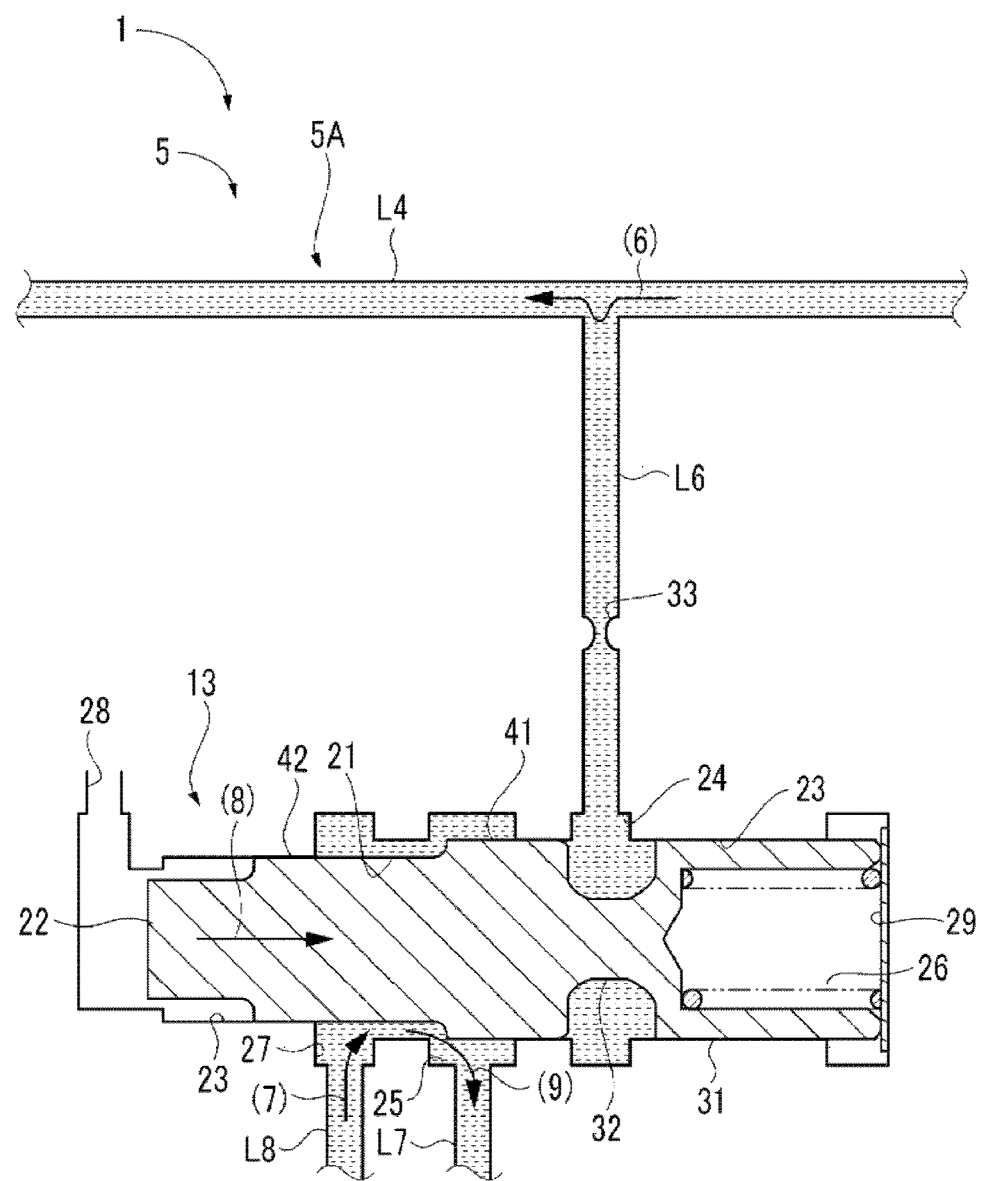
FIG. 4 is an operational view of the low pressure fluid discharge valve of the present embodiment when a fluid pressure of a discharge flow path increases.

As illustrated in FIG. 4, when the pressure of the lubricating oil in the discharge flow path L8 further increases to an excessively high level and becomes equal to or higher than a predetermined upper limit pressure, the pressure of the lubricating oil that has become the predetermined upper limit pressure or higher is applied also to the piston position control chamber 27 (arrow (7)). Then, the accumulator piston 22 is moved further to one end side of the piston housing chamber 21 (arrow (8)). At this time, a gap is generated between the inner circumferential surface 23 of the large diameter which is in contact with the large diameter portion 41 of the diameter D1 (see FIG. 2) and the small diameter portion 42, and the piston position control chamber 27 communicates with the discharge port 25 via the circumferential surface of the small diameter portion 42 of the accumulator piston 22. Therefore, the lubricating oil in the discharge flow path L8 is released to the return flow path L7 (arrow (9)). In this way, when the pressure of the lubricating oil in the discharge flow path L8 further increases and becomes equal to or higher than the predetermined upper limit pressure, the lubricating oil in the discharge flow path L8 is released to the return flow path L7, and thereby a line pressure of the third flow path L3 or the like can be prevented from becoming excessively high and reliability of the fluid pressure loop 1 can be improved.

In the present embodiment, description has been made using the friction clutch as the first lubricating portion 4A and the differential gear as the second lubricating portion 4B, but the first lubricating portion and the second lubricating portion of the disclosure are not limited thereto.

Further, the line pressure may be set to a low pressure so that the line pressure does not become equal to or higher than the predetermined pressure when an automatic transmission is in an N range. When the line pressure in the N range is set to a low pressure, the supply port 24 and the discharge port 25 of the low pressure fluid discharge valve 13 communicate with each other to discharge some of the lubricating oil in the first lubrication flow path L4 through the release flow path L6, and thereby the flow rate of the lubricating oil supplied from the first lubrication flow path L4 to the first lubricating portion 4A can be reduced. As a result, even when a temperature of the lubricating oil becomes extremely low and a viscosity of the lubricating oil becomes extremely high, since the flow rate of the lubricating oil supplied to the first lubricating portion 4A can be reduced, it is possible to prevent a creep phenomenon due to dragging (increase in frictional resistance) of the clutch or the like.

What is claimed is:

1. A fluid pressure loop comprising:
   an operation loop which supplies a fluid to an operating portion;
   a lubrication loop which supplies a fluid to a lubricating portion;
   a fluid pump which feeds the fluid; and
   a main control valve which controls a fluid pressure of the operation loop by controlling a flow rate of the fluid from the fluid pump to the lubrication loop, wherein
   the lubrication loop includes:
   a lubrication flow path which introduces the fluid from the main control valve;
   a release flow path connected to the lubrication flow path and configured to release the fluid;
   a low pressure fluid discharge valve connected to the release flow path and configured to discharge the fluid of the lubrication flow path;
   a return flow path connected to the low pressure fluid discharge valve and configured to return the fluid to the fluid pump; and
   a discharge flow path which introduces the fluid discharged from the fluid pump into the low pressure fluid discharge valve, wherein
   the low pressure fluid discharge valve includes
   a piston housing chamber formed in a cylindrical shape;
   a piston slidably housed in the piston housing chamber;
   an annular supply port formed on an inner circumferential surface of the piston housing chamber and connected to the release flow path;
   a discharge port formed in an annular shape at a distance from the supply port in the piston housing chamber and connected to the return flow path;
   a spring disposed at one end of the piston housing chamber and configured to bias the piston to the other end;
   a piston position control chamber formed in the piston housing chamber on a side opposite to the supply port with respect to the discharge port and configured to make a pressure of the fluid of the discharge flow path work; and
   an annular spool groove formed on an outer circumferential surface of the piston and having a width extending from the supply port to the discharge port, wherein
   the piston is biased to the other end side of the piston housing chamber due to the spring when the pressure of the fluid applied to the piston position control chamber is less than a predetermined pressure so that the supply port and the discharge port communicate with each other via the spool groove, and
   the piston is moved to one end side of the piston housing chamber against a biasing force of the spring by applying a pressure of the fluid equal to or higher than the predetermined pressure to the piston position control chamber so that the supply port and the discharge port are blocked from each other.

2. The fluid pressure loop according to claim 1, wherein the low pressure fluid discharge valve serves also as a pressure accumulator which mitigates pulsation of the fluid discharged from the fluid pump by introducing the fluid in the discharge flow path into the piston position control chamber.

3. The fluid pressure loop according to claim 2, wherein an orifice is formed in the release flow path.

4. The fluid pressure loop according to claim 1, wherein an orifice is formed in the release flow path.

* * * * *